United States Patent [19]
Ash et al.

[11] Patent Number: 5,130,982
[45] Date of Patent: Jul. 14, 1992

[54] FULLY SHARED COMMUNICATIONS NETWORK

[75] Inventors: Gerald R. Ash, West Long Branch, N.J.; Steven D. Schwartz, Bronx, N.Y.

[73] Assignee: AT&T Bell Laboratories, Murray Hill, N.J.

[21] Appl. No.: 548,423

[22] Filed: Jul. 5, 1990

Related U.S. Application Data

[63] Continuation of Ser. No. 373,966, Jun. 30, 1989, abandoned.

[51] Int. Cl.⁵ .............................. H04J 3/16; H04J 3/17
[52] U.S. Cl. .................................... 370/85.7; 370/79; 370/60
[58] Field of Search ............ 370/85.7, 60, 94.1, 370/95.1, 79

[56] References Cited

U.S. PATENT DOCUMENTS

| | | | |
|---|---|---|---|
| 3,597,689 | 8/1971 | Ferrell | 325/51 |
| 4,345,116 | 8/1982 | Ash et al. | 179/18 |
| 4,556,972 | 12/1985 | Chan et al. | 370/60 |
| 4,669,113 | 5/1987 | Ash et al. | 379/221 |
| 4,763,321 | 8/1988 | Calvignac et al. | 370/94 |
| 4,993,014 | 2/1991 | Gordon | 370/95.1 |
| 5,001,703 | 3/1991 | Johnson et al. | 370/95.1 |

OTHER PUBLICATIONS

"Design of Integrated Packet and Circuit Switching Networks", IEEE, 1986, M. Gerla et al, pp. 1589-1593.
"Integrated Network Routing and Design", CCITT, Sep. 8-19, 1986, pp. 1-10.
"Bandwidth Allocation Strategies in Wide-Band Integrated Networks", IEEE Journal on Selected Areas in Comms., vol. SAC-4, No. 6, Sep. 1986, B. Kraimeche et al, pp. 869-878.
"Fxnet: a Backbone Ring for Voice and Data", IEEE Communications Magazine, Dec. 1986, vol. 24, No. 12, L. M. Casey et al, pp. 23-28.
"A Broadband-Based Integrated Voice/Data/Video Network of Multiple Lans with Dynamic Bandwidth Allocation", IEEE 1987, S. M. Sharrock, et al, pp. 417-425.
"Bandwidth Switching and New Network Architectures", ITC 12, Torino, Jun. 1988, R. G. Addie et al, pp. 2.3iiA.1.1-2.3iiA.1.6.
"Faster Packets for Tomorrow's Telecommunications", AT&T Technology Products, Systems and Services, vol. 3, No. 4, 1988, S. B. Andrews et al, pp. 24-33.

Primary Examiner—Douglas W. Olms
Assistant Examiner—Min Jung
Attorney, Agent, or Firm—F. B. Luludis

[57] ABSTRACT

The architecture of a communication network comprising a plurality of nodes interconnected by a transmission facility having a bandwidth divisible into channels of respective bandwidths, e.g., optical fiber, is enhanced by fully sharing the network bandwidth among the network nodes, such that each pair of nodes, on periodic basis, dynamically establishes respective direct links to each of the other network nodes, in which a direct link is formed from a group of channels obtained from the network bandwidth. The remaining bandwidth is then used to form a pool of bandwidth which is shared among the network nodes on a dynamic basis, such as, for example, establishing a communication path between a pair of nodes to route a call from one node to the other node of the pair of nodes.

29 Claims, 12 Drawing Sheets

| | ROUTE STATUS | 25 | 30 | 35 | 40 | 45 | 50 | → NSN |
|---|---|---|---|---|---|---|---|---|
| "a" | NSN 45 LL1VTG $^i$ | 0 | 0 | 1 | 1 | 0 | 1 | |
| "b" | NSN 25 LL1VTG $^i$ | 0 | 1 | 1 | 1 | 0 | 1 | |
| "c" | NSN 25 AISW FOR NSN 45 | 0 | 1 | 1 | 1 | 0 | 0 | |
| "d" | RESULTING AISW | 0 | 0 | 1 | 1 | 0 | 0 | |

| ROUTE STATUS | 25 30 35 40 45 50 $\longrightarrow$ NSN |
|---|---|
| NSN 45 LL1LL2 VTG$^i$ | 0 1 1 1 0 1 |
| NSN 25 LL1LL2 VTG$^i$ | 0 1 1 1 0 1 |
| NSN 25 AISW FOR NSN 45 | 0 1 1 1 0 0 |
| RESULTING AISW | 0 1 1 1 0 0 |

ONE MINUTE UPDATE

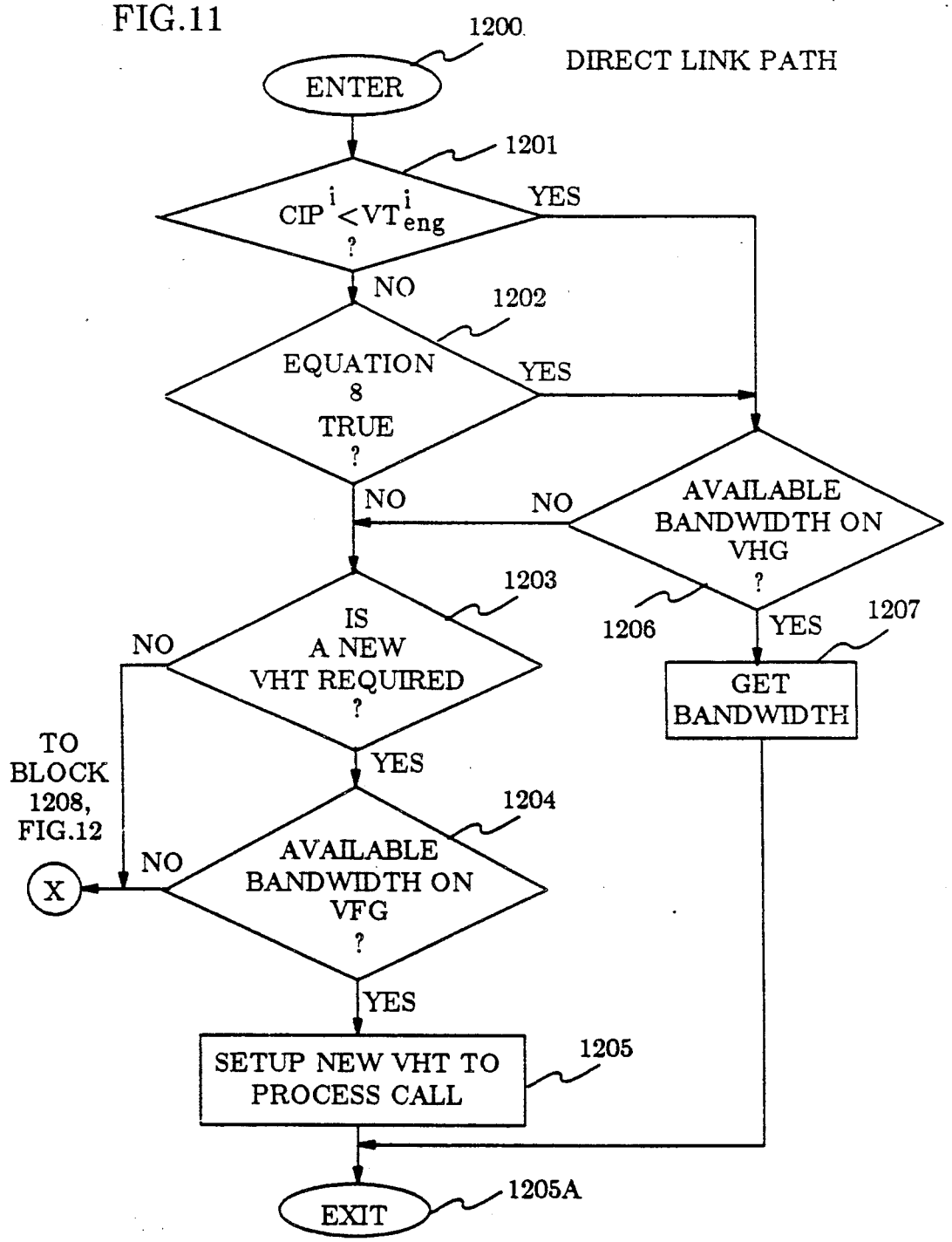
FIG.11     DIRECT LINK PATH

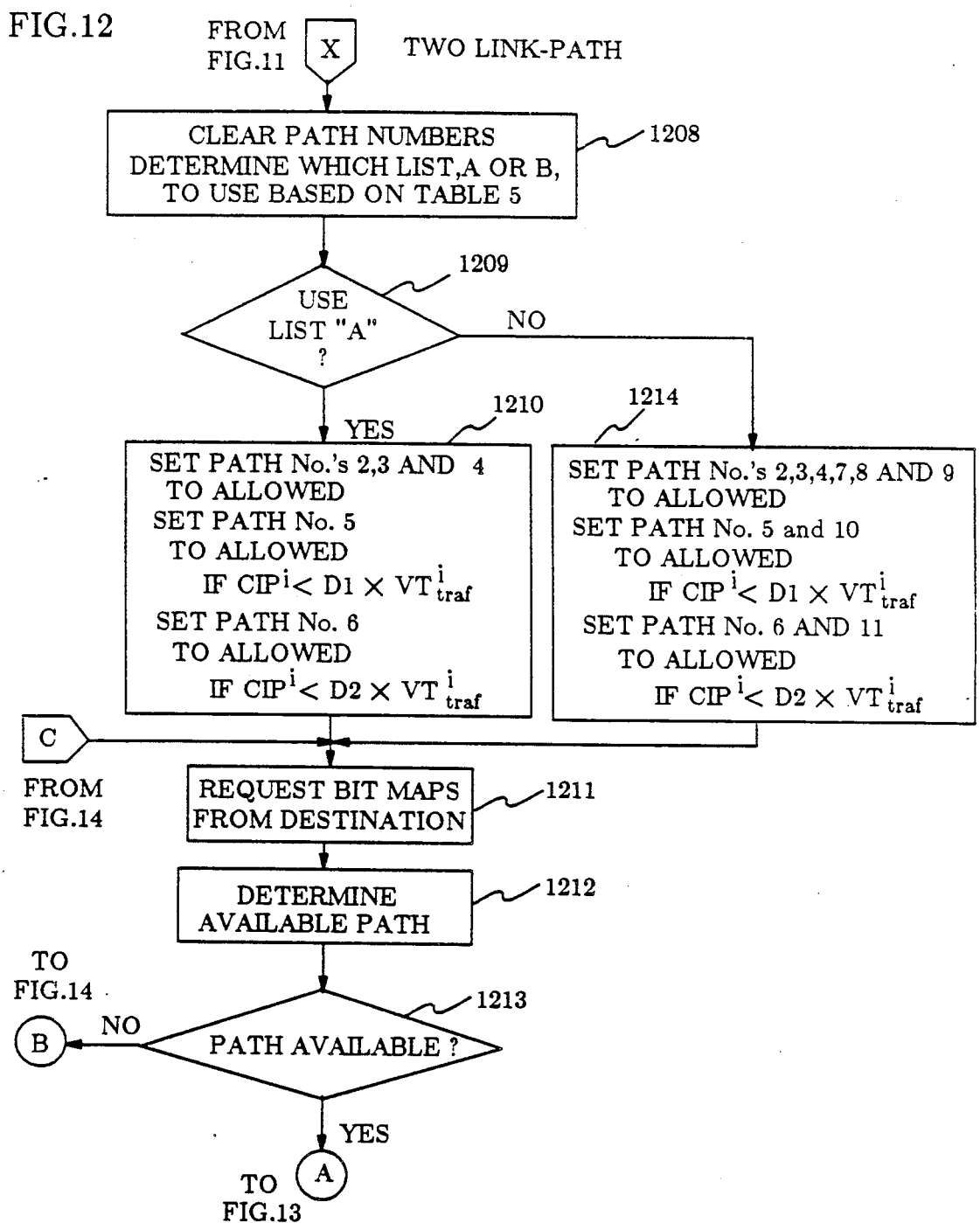

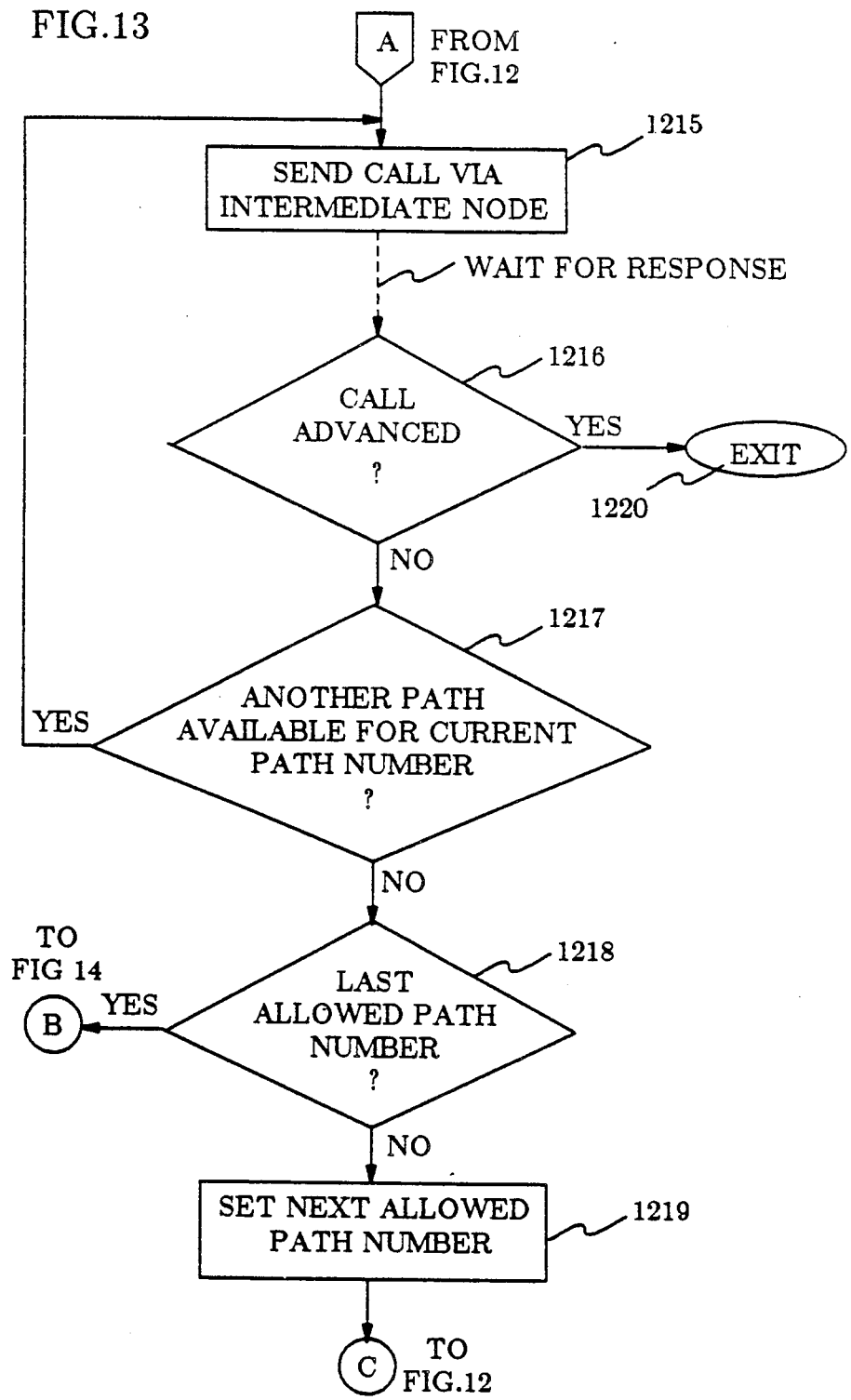

FULLY SHARED COMMUNICATIONS NETWORK

This application is a continuation of application Ser. No. 373,966, filed on Jun. 30, 1989, now abandoned.

TECHNICAL FIELD

The invention relates to an arrangement for routing traffic and, more particularly, to an arrangement which fully shares the network bandwidth to improve the efficiency of such routing.

BACKGROUND OF THE INVENTION

Routing paths through a large network, such as, for example, the public switched network, are based on what is commonly referred to as the traffic, or logical network. For example, FIG. 1 illustrates a small portion of a large network, in which the interconnection of nodes, or switching centers (SC), 5, 10, 15 and 20 is based on the logical network, such that each SC appears to be connected directly to the other three SCs, thereby providing an appreciable number of alternate routes between each pair of SCs when a direct route, or path, is blocked. Thus, if it is assumed that communication path 7 between SCs 15 and 20 is momentarily blocked (for whatever reason), then SC 15 may route any additional traffic that it needs to send to SC 20 via an alternate route comprising SC 5 and communication paths 6 and 12. Alternatively, the additional traffic may be sent via the alternate route comprising SC 10 and communications paths 11 and 8. Accordingly, the level of interconnection in the logical network is apparently quite high. The high level of such interconnection is actually achieved by superimposing the logical network on what is commonly referred to as the facility network, the facility network being the actual physical network, as shown in FIG. 2.

It is seen from FIG. 2, that the interconnection of the SCs is not as expansive as it appears to be in FIG. 1. Specifically, the direct communication paths 9, 11 and 12 do not actually exist in the facility network. In fact, in the present illustrative example, communication path 9 is routed through SCs 20 and 15, communication path 11 is routed through SC 20, and communication path 12 is routed through SC 15. The alternate path therefore includes communication path 6 connected between SCs 5 and 15 and communication path 12 which is routed through SC 15. However, SC 15 is not aware that the routing of path 12 passes through SC 15 and, therefore, cannot take advantage of that fact in the direct routing of traffic between itself and SC 20. A similar case is apparent in connection with paths 11 and 8.

Thus, the way in which traffic is alternate routed is not always handled in the most expeditious and efficacious manner. Moreover, such routing becomes even less efficient in the instance where the individual communication paths are segments of the bandwidth of a cable, for example, an optical fiber cable. That is, communication paths 6 through 12 are assigned respective segments of the bandwidth of an optical fiber interconnecting SCs 5, 10, 15 and 20. Alternatively, such bandwidth could be the bandwidth of radio or microwave, or even a combination of those facilities, including optical fiber.

SUMMARY OF THE INVENTION

We have recognized that the efficacy of a large network could be significantly enhanced by avoiding the logical network concept and allowing the SCs, or nodes, to fully share the network bandwidth on a dynamic basis. Accordingly, our fully shared network is highly flexible in the routing of traffic and virtually eliminates the need to provide alternate routing as it is done in prior arrangements. Specifically, on a periodic basis, e.g., one-minute intervals, the network bandwidth is allocated among the network nodes such that each pair of nodes establishes respective direct links to each of the other network nodes for the routing of calls thereto, in which each direct link is formed from one or more groups of channels associated with calls of respective classes of service. The remaining network bandwidth is then reserved for use as a pool of bandwidth that is shared on a dynamic basis. For example, a call routed between a pair of nodes is routed over a channel obtained from the shared pool of bandwidth, in which the channel is returned to the shared pool when the respective call is terminated. The shared pool may be also used in other call routing instances, such as where the channels assigned to a direct link are busy.

BRIEF DESCRIPTION OF THE DRAWINGS

In the drawing:

FIGS. 6–8 illustrate examples in selecting a call route in accordance with the invention under different traffic conditions;

FIGS. 9–14 are flow charts describing the operation of the network nodes of FIGS. 3 and 4 in relation to, inter alia, establishing direct links for the routing of calls;

DETAILED DESCRIPTION

Figure 3:
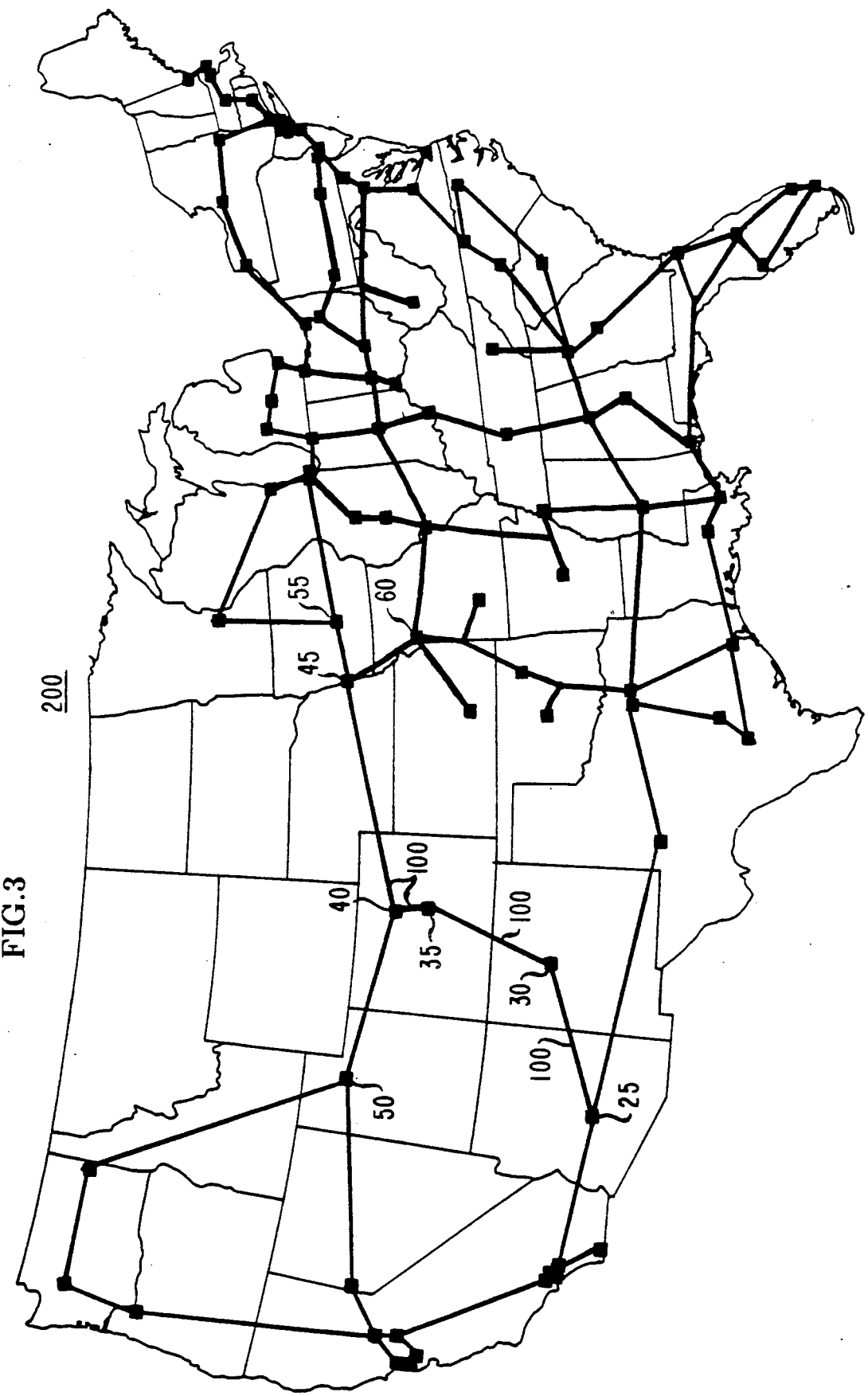
FIG. 3 shows the geographical extent of an illustrative network in which the invention may be practiced.

Referring now to FIG. 3, there is shown a broad block diagram of digital public switched facility network 200 comprising a plurality of switching centers, or nodes, such as nodes 25, 30, 35, 40, 45, 50, etc., interconnected via network transmission facilities 100. In the FIG., each node, for example, node 25, is represented by a filled-in square, and includes, inter alia, what is commonly referred to as a stored program controlled switching office (SPC), such as the well-known No. 4 ESS available from AT&T. (The No. 4 ESS is disclosed in the publication of the *Bell System Technical Journal*, Vol. 56, No. 7, (September, 1977), pp. 1015-1336, which is hereby incorporated by reference.) Each node also includes a digital cross-connect arrangement (DACS), which may be, for example, the Digital Access and Cross-Connect System IV available from AT&T. The DACS responsive to a request from the SPC, digitally multiplexes from the input to the output of its associated node a segment (channel) of the bandwidth of transmission facilities 100. Transmission facilities 100, which may be, for example, optical fiber, is thus "daisy chained" through each of the nodes such that the network nodes may dynamically share the bandwidth provided by transmission facilities 100. (Hereinafter, transmission facilities 100 will also be referred to as network bandwidth 100.)

Figure 4:
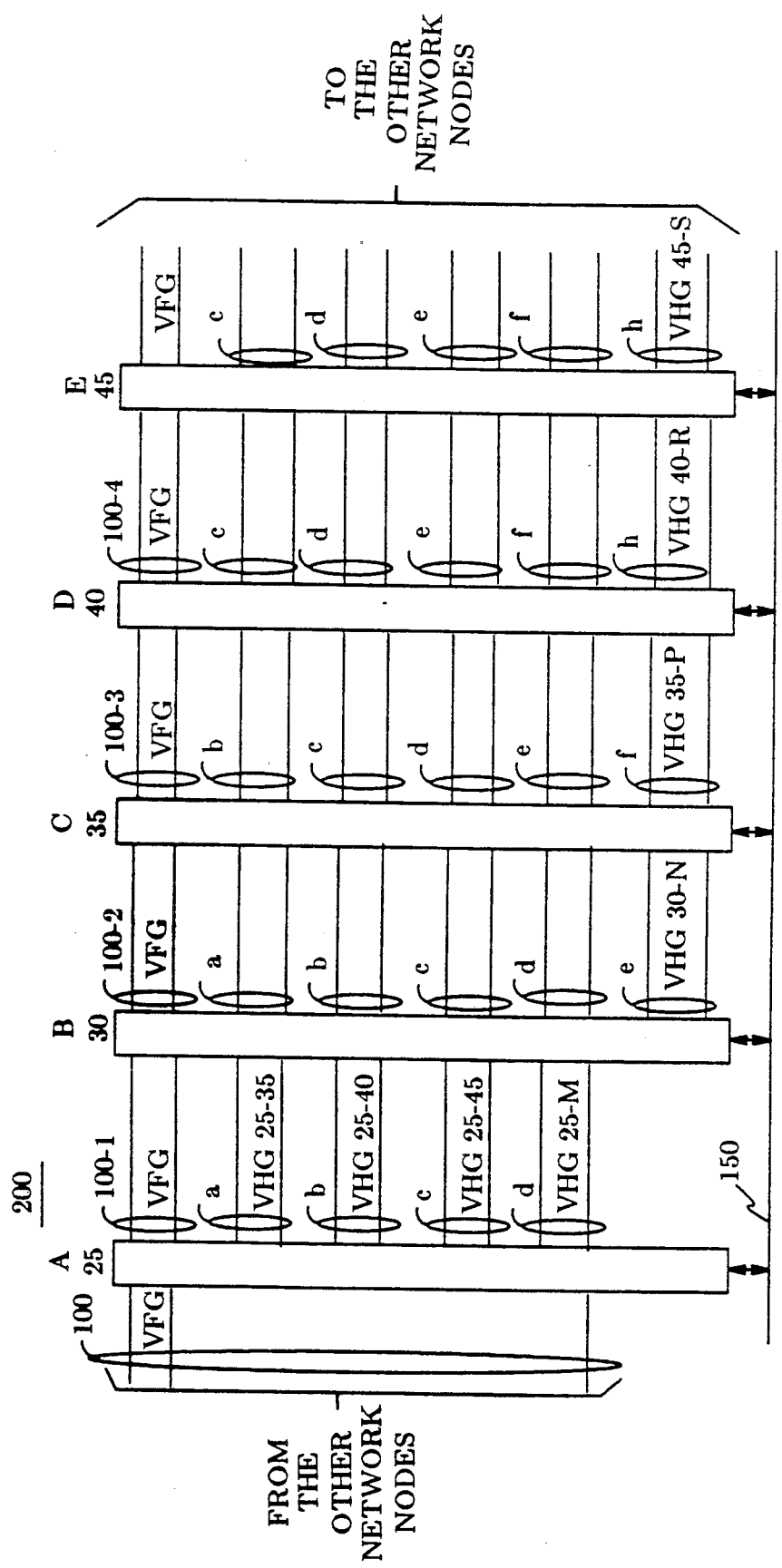
FIG. 4 is a broad block diagram of a subset of the network of FIG. 3.

For the sake of brevity and clarity the following discussion will will center on nodes 25, 30, 35, 40 and 45, as shown in FIG. 4. However, it is to be understood that such a discussion pertains equally well to the other nodes of network 200.

In particular, except as noted below, each node in the network, such as node 25, establishes a direct path, or link, to every other node in the network, for example, node 35, in which the path is a segment of network bandwidth 100 that is required for the transmission of traffic of a respective class of service that may be sent from node 25 (i.e., the originating node) to node 35 (i.e., the terminating, or destination node). The size of such a segment is based on the traffic load of the particular class of service that node 25 anticipates sending to node 35. Node 25 determines the anticipated traffic load using traffic statistics that it accumulates over a predetermined period of time, e.g., one minute.

That is, in contemplation of a multiservice integrated network, such as the network of FIG. 3, a call associated with a respective class of service is assumed to consume an average bandwidth of $r_i$ (where i = the class of service) over a single unit of capacity defined herein as being one virtual trunk (VT). For example, a VT would have an $r_i$ equal to 64 kbps (kilobits per second) for either voice or certain data traffic. It would also be equal to 384 kbps for a call associated with 384 switched digital service (H0 channel), and equal to 1536 kbps for a call associated with 1536 switched digital service (H11 channel), and so on.

(It is to be understood of course that the foregoing named services should not be construed as a limitation, since our invention may easily and efficiently accommodate other services, such as so-called Broadband—ISDN (Integrated Service Digital Network), which will soon offer so-called DS3 rate connections having a data rate of approximately 40 mbps, as well as other future high-data-rate services.)

Thus, at the beginning of each one minute interval, each node, for example, node 25, calculates the number of VTs that it will require to transmit to each other node, such as node 35, traffic, or data, of a particular class of service using the traffic load statistics that node 25 accumulated over a preceding one minute interval for that particular class of service. The resulting number of VTs, or size of the bandwidth, is defined herein as a virtual trunk group (VTG) for the respective service. Each VTG established by a node is designed to have a high occupancy rate, such as 90 percent or better, for efficient use of the network bandwidth, as will be discussed below in detail. A group of such VTGs can be shared among the various services offered to the network, as discussed below, and constitutes what we call a virtual high usage group (VHG) directly linking one node to another node.

Therefore, in accordance with the invention, (except as noted below) each network 200 node dynamically establishes a direct link (VHG) to each of the other network nodes, in which a link is derived from the shared pool of network bandwidth. For example, it is seen from FIG. 4, that a respective direct link connects node 25 to each of the other nodes. That is, VHG25-35, VHG25-40 and VHG25-45 directly link node 25 to nodes 35, 40 and 45, respectively. VHG25-M collectively represents the VHGs (direct links) which connect node 25 to the remaining ones of the network nodes. In addition, the other network nodes, for example, nodes 30, 35, 40 and 45, are also directly linked to each other network node via respective VHGs, as represented by VHG30-N, VHG35-P, VHG40-R, and VHG45-S. Although not explicitly shown in the FIG., VHG35-P, VHG40-R and VHG45-S each include a direct link (VHG) to node 25. In addition, VHG40-R and VHG45-S each include a direct link to node 30, and VHG45-S includes a direct link to node 35, and so on. The remaining bandwidth of network bandwidth 100 then constitutes a pool of bandwidth, which we call a virtual final trunk group (VFG) of bandwidth and which is shared among the network nodes as needed.

The VFG (shared pool of bandwidth) is also used to establish a call (traffic of a particular type of service) between directly connected nodes. For example, node 30, does not establish a VHG between itself and nodes 25 and 35, respectively. That is, in the event that a node receives a call from an external source, such as a central office (CO), then the node translates the associated called telephone number into a number of parameters. Three of these parameters are (a) a network switch number (NSN) identifying the node that is to receive the call, i.e., the terminating node, (b) the class of service associated with the call, and (c) a routing pattern index. In the present example of node 30, if the NSN happens to identify node 25 (35), then node 30 establishes, in accord with the respective routing index, a single-link path between itself and node 25 (35) using a respective channel obtained from the VFG and sets up the call over that channel. Thereafter, node 30 returns the channel to the VFG when the call is disconnected. Node 30 establishes the single-link path by communicating with node 25 (35) via common communication path 150. Communication path 150 could be the well-known common channel signaling arrangement (CCS) or other data communication network, which the network nodes use to communicate with one another. Thus, in accordance with an aspect of the invention, a path for a single-link call is established on demand, in real time, using bandwidth obtained from the shared pool of bandwidth, as will be explained below. (Hereafter the term "adjacent" nodes will be taken to mean a pair of nodes that are connected via a single-link path using bandwidth obtained from the VFG. Thus, node pairs 25 and 30, 30 and 35, 35 and 40, and so on, constitute adjacent nodes.)

In other instances, the primary objective is to route a call via a direct link. However, if a direct link is not available, then a node may use bandwidth obtained from the VFG, as will be discussed below in detail. Before doing so, and to set the stage for the following discussion, a node attempts the following ordered set of path choices to route a call that it has received from, for example, a CO:

1. Select direct link capacity on a variable virtual high usage trunk group (VHG);
2. If the respective VHG is busy and the current estimated capacity for that VHG exceeds the current size of the VHG, then "establish" an additional virtual high usage trunk using bandwidth (channel) obtained from the VFG, and set up the call on the new VHG trunk;
3. If bandwidth is not available in the VHG, as discussed in steps 1 and 2, then route the call via a two-link path using, for example, the so-called Real Time Network Routing (RTNR) strategy; and
4. If a two-link path is not available, then route the call via a multilink path over the backbone network of virtual final trunk groups.

In an illustrative embodiment of the invention, it is contemplated that bandwidth for each call is obtained from the shared pool (VFG) and used to set up a call as in step 4 above, and is returned to the shared pool after the call is terminated. In this way, the capacity of the shared pool of bandwidth is made available to the network nodes as it is needed. Thus, the invention meets the goals of "no alternative routing" and "full sharing of the network bandwidth". As will now be described, our illustrative embodiment uses the four steps listed above as an efficient implementation of the invention. We therefore begin with a discussion directed to establishing the size of a direct link (VHG).

As mentioned above, each network node establishes a VHG to every other node. in which the size of a particular VHG is determined from respective traffic load statistics accumulated over a preceding one minute interval. Such statistics include (a) a count of the calls relating to a respective service which did not reach a particular destination due to an overflow condition ($OV^i$); (b) a count of the total number of calls for that service to that destination ($PC^i$); and (c) a count of the number of calls currently in progress for that service and to that destination ($CIP^i$). Using the values of the foregoing counts obtained for a particular service, a node then determines the size of the bandwidth that it will need to support the level of traffic for the service that the node expects to send to another node during the current one minute interval. The node then sums the bandwidth that it calculates for each of the services to determine the size of the VHG that will link the node to the other node.

In particular, a node first estimates the traffic load for a respective service using, for example, the following relationship:

$$TL^i = 0.5 \times TL_{n-1}^i + [0.5 \times CIP_n^i \times (1/(1 - OV_n^i/P - C_n^i))] \quad (1)$$

Where TL is the estimated traffic load that is expected for service i during the current one-minute interval n. Knowing $TL^i$, the node then determines the minimum virtual trunk requirement ($VT^i$) for the service using the following relationship:

$$VT_{traf}^i = 1.1 \times TL_n^i \quad (2)$$

where $VT_{traf}^i$ is the maximum virtual trunk requirement for the respective service to meet its blocking objective. As mentioned above, a VTG may be designed, for example, for 90 percent occupancy or better. Therefore, the estimated size of a VTG for a particular class of service i may be approximated by 90 percent of the value obtained from equation (2), as determined by the following illustrative relationship:

$$VT_{eng}^i = 0.9 \times VT_{traf}^i \quad (3)$$

where $VT_{eng}^i$ is the engineered VT capacity of $VTG^i$ for service i. Accordingly, the node performs the foregoing calculations for each class of service that it processes. The node then, as mentioned above, sums the results obtained from equation (3) to determine the total size of the VHG that it may require during the current one minute interval to transmit traffic associated with respective classes of service to a particular node. The foregoing procedure thus recognizes that the sum of those values is less than the total bandwidth ($BW_t$) allocated to the associated VHG.

Figure 1:
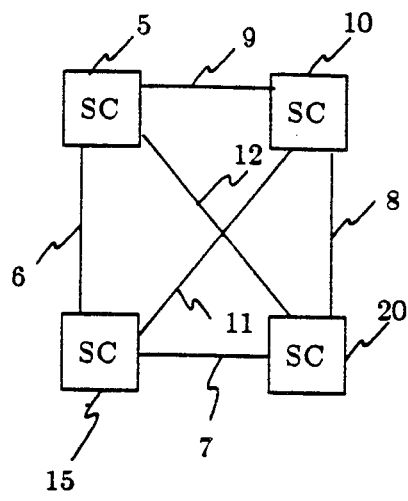
FIGS. 1 and 2 illustrate prior network routing arrangements, which are useful in understanding the problems associated with such arrangements.
Figure 2:
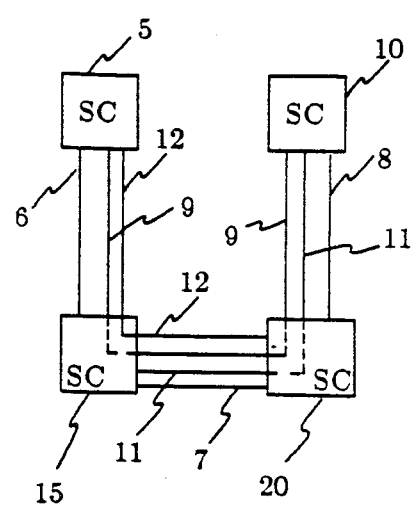
Figure 5:
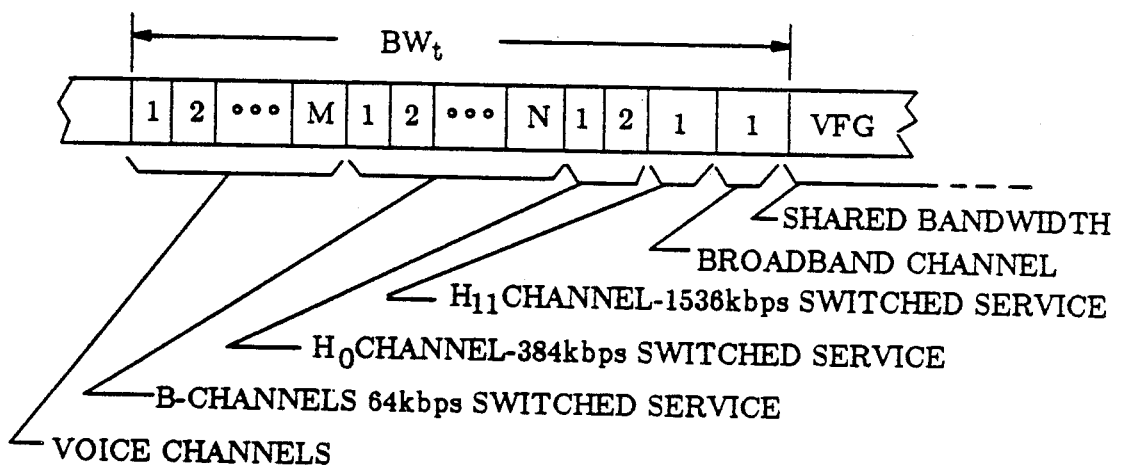
FIG. 5 is an illustrative example showing how the bandwidth of the transmission facilities of FIGS. 3 and 4 may be divided into a plurality of channels of respective bandwidths.

Turning now to FIG. 5, there is shown an illustrative example of the way in which a portion of network bandwidth 100 is allocated for use as a VHG. It is seen that the size of the VHG, or total bandwidth $BW_t$, includes an engineered number of VTs (channels) ($VT_{eng}$) allocated to respective classes of service. As a result of performing the calculations defined by equations (1), (2) and (3), a node, for example, 25, has determined that it will require M 64 kbps channels for voice ($VT_{eng} = M$), N 64 kbps channels for switched data ($VT_{eng} = N$), two 384 kbps channels ($VT_{eng} = 2$), one 1536 kbps channel ($VT_{eng} = 1$) and one broadband channel ($VT_{eng} = 1$) to form a VHG to another node, for example, node 35 during the current one minute interval, where M and $N \geq 1$. Thus, the total number of engineered channels (M+N+2+1+1) forms a pool of bandwidth (VHG) that may be shared among all five services, but is allocated to the respective services in the above proportions when it is necessary, as will be explained below. FIG. 5 also shows that a portion of network bandwidth 100 is set aside as a shared pool of bandwidth, or VFG.

Thus, in accordance with the invention, network bandwidth 100 is partitioned such that each network node using the above equations establishes a VHG to each of the other network nodes, in which each VHG is dynamically sized to meet the traffic load that may occur during the current one-minute interval. The remaining bandwidth of bandwidth 100 is then used to serve as the shared pool (VFG).

The establishment or disconnection of a virtual high usage trunk (VHT) from a node, for example, node 25, to another node, for example, node 35 is performed on the demand. What this means is that node 25 establishes a VHT between itself and node 35 in conjunction with a call originating at node 25 and terminating at node 35. Node 25, on the other hand, returns an excess VHT to the shared pool in conjunction with the disconnection of a call. For example, assume that during the preceding one-minute interval node 25 used 10 VHTs to support voice traffic to node 35. Also assume that as a result of performing the foregoing calculations node 25 determines that 11 VHTs (channels) would be needed to support voice traffic to node 35 during the current, ensuing, one-minute interval. That is, the number of voice VHTs that node 25 may need for the current one-minute interval is one more than the number that was required during the preceding interval. As an aspect of the invention, node 25 establishes the additional VHT between itself and node 35 only when the VHT is actually needed. Thus, node 25 establishes the eleventh voice VHT when it receives an incoming voice call destined for node 35 and the 10 voice VHTs that node 25 has already established between itself and node 35 are being used for other voice calls terminating at node 35, and none of the VHTs to node 35 established for other services are available to be shared, as will be described below.

Node 25 establishes the eleventh voice VHT by first obtaining a voice channel from the shared pool and then connecting the incoming voice call to the channel via the associated digital cross-connect arrangement (discussed below). In addition, node 25 sends to node 35 and each intervening node in the path, i.e., node 30 via common channel signaling path (CCS) 150 a message. The message that node 25 sends to those nodes contains, inter alia, the (a) identity (called telephone number) of the call; (b) identity of node 25 as the originating node; (c) identity of node 35 as the terminating node; (d) identity and size of the VHT channel; and (e) identity of the class of service being served by the identified channel. Node 30 and 35, in turn, store the information in their internal memory. Node 35 thereafter "scans" the identified channel to receive the incoming call and route it to its local destination as identified by the associated called number. Node 30, on the other hand, responsive to receipt of the message directs the digital cross-connect arrangement (DACS) contained in node 30 to "cut through" the identified VFG channel to the output of node 30 and thence to node 35.

Similarly, if the number of voice VHTs that node 25 may need for the current one-minute interval is, for example, one less than the number required during the preceding interval, then node 25 returns to the shared pool the next voice VHT that becomes idle as a result of the associated call being disconnected from that VHT. Node 25 does this by sending to the terminating node, and intervening nodes (if any), e.g., nodes 30 and 35, via the CCS channel a message containing, inter alia, (a) the identity of node 25 as the originating node; (b) the identity of node 35 as the terminating node; (c) the identity of the VHT channel; (d) a flag indicating that the call has been disconnected; and (e) a flag indicating that the identified channel is being returned to the shared pool. Node 35 responsive to receipt of the message, disconnects the channel from the route that node 35 established to the local destination, and erases from internal memory the identity channel originating from node 25. Node 30, on the other hand, disables (breaks down) the cross connection that it had established to cut through the identified channel to node 35, thereby returning the channel to the shared pool of bandwidth (VFG).

As mentioned above, a node may set up a call over a two-link path whenever a respective direct link is not available. The reasons for allowing a call to be set up over a two-link path is to conserve network bandwidth. As mentioned, the selection of a two-link path is in accordance with the aforementioned real-time-network-routing (RTNR) strategy disclosed in copending U.S. patent application of Ser. No. 291,815 filed Dec. 29, 1988, in behalf of G. R. Ash et al.

Specifically, to select a two-link path for the routing of a call, the originating node sends to the terminating node via CCS path 150 a message requesting the current traffic capacity (load status) of direct links which have the same class of service as the present call and which extend from other nodes to the terminating node. The terminating node responsive to receipt of the message returns to the originating node via CCS path 150 one more so-called bit maps detailing the requested information. The originating node then "ands" the received bit map(s) with bit map(s) of its own, detailing the load states of direct links having the same class of service as the present call and extending from the originating node to the nodes listed in the received bit map(s). The originating node then "ands" the result with a bit map identifying the allowed intermediate (intervening) nodes that may be used in the routing of the call to the terminating node. Such allowed paths are paths which meet particular transmission quality assurance (TQA) parameters, such as a parameter which calls for echo cancellers in the path when the path exceeds a predetermined distance. Paths which do not meet those parameters are defined herein as being grade-2, or G-2 paths.

It can be appreciated from the foregoing that a determination of the load status of a VTG is fundamental to the selection of either a direct link or two-link path to a terminating node. Accordingly, we will first discuss the process of determining VTG load status and the notion of trunk reservation as it pertains to the present invention. We will then go on to discuss a number of illustrative examples detailing the routing of calls, in which the calls are routed in accord with the principles of our invention.

Specifically, the load status for a $VTG^i$ is based on the number of VTs in the $VTG^i$. We define the current load status of a $VTG^i$ as being one of six load states, namely, most lightly loaded (LL1), medium lightly loaded (LL2), least lightly loaded (LL3), heavily loaded (HL), reserved (R) and busy (B), each associated with a respective trunk threshold value, as shown below. Specifically, if the number of available virtual trunks exceeds a lightly loaded threshold state, e.g., more than 5 percent of the virtual trunks in the $VTG^i$, then the $VTG^i$ is considered to be lightly loaded. If the number of available VTs is less than the lightly loaded state threshold but greater than the heavily loaded state threshold, e.g., somewhere between one trunk and 5 percent of the total number of VTs in the group, then the $VTG^i$ is considered to be heavily loaded. A $VTG^i$, on the other hand, is considered to be busy when none of its VTs are available. (It is to be understood of course that additional load states could be employed to more precisely define the load status of a $VTG^i$. However, such precision would not affect the basic principles of our invention.)

We define the reserved state as a state that is only used when the number of blocked calls handled by a $VTG^i$ exceeds an associated grade of service objective. When such blocking occurs, a reserved state threshold is set based on the level of blockage. The load state thresholds for both the heavily and lightly loaded states (LL1, LL2 and LL3) are then increased by the value of the reserved state threshold, as is similarly disclosed in the aformentioned G. R. Ash et al patent application.

Specifically, if node-to-node blocking is detected over a one minute interval, then a so-called reservation level $R^i$ associated with the affected $VTG^i$ is set according to the level of the node-to-node congestion occurring for that $VTG^i$. In this manner, two-link traffic attempting to use the affected $VTG^i$ is subject to the group's reservation level. That is, a $VTG^i$ having a reserve load status may be used to establish a two-link path to a terminating node only when certain conditions are met, as will be shown below.

Thus, each node calculates a reservation level $R^i$ for each of its VTGs based on a blocking level prescribed for the node pair and the level of estimated node-to-node traffic handled by the $VTG^i$. The node-to-node blocking level associated with a $VTG^i$ is equal to the node-to-node overflow count ($OV^i$) divided by the peg count ($PC^i$) taken over the preceding one minute interval for the node pair. If the blocking for the node pair exceeds a predetermined threshold, then the reservation level $R^i$ is calculated using a level that is based on the estimated traffic load for the service, i.e., $TL^i$. As discussed above in connection with equations (1) and (2), $TL^i$ is used to estimate a minimum virtual trunk (VT) requirement for the service to meet its blocking objective, $VT_{traf}$, that is, $$VT_{traf}^i = 1.1 \times TL^i \quad (4)$$

where the 1.1 is selected to ensure a desired occupancy rate of, for example, 90 percent. $R^i$ is then determined according to the illustrative values shown in the following table.

TABLE I

| N—N blk, % Threshold | Trunk Group Reservation Level Reservation Level | $R^i$ (VTs) | $R_{min}^i$ | $R_{max}^i$ |
|---|---|---|---|---|
| [0,1] | 0 | 0 | 0 | 0 |
| (1,5] | 1 | $.05 \times VT_{traf}^j$ | 2 | 10 |
| (5,15] | 2 | $.10 \times VT_{traf}^j$ | 4 | 20 |
| (15,50] | 3 | $.15 \times VT_{traf}^j$ | 6 | 30 |
| (50,100] | 4 | $.20 \times VT_{traf}^j$ | 8 | 40 |

Note that the reservation level for each class of service is at most $R^i$, as defined above, but is bounded by $VT_{traf}^i - CIP^i$, that is:

$$R_{traf}^i = \min[R^i, \max(0, VT_{traf}^i - CIP^i)] \quad (5)$$

Illustrative values for thresholds that are used to determine the aforementioned VTG load states are summarized in the following table:

TABLE 2

| Trunk Group Load State Thresholds | | |
|---|---|---|
| Threshold | # VTs | Min | Max |
| TK1 | $.05 \times VT_{traf}^j$ | 2 | 10 |
| TK2 | $.10 \times VT_{traf}^j$ | 11 | 20 |
| TK3 | $.15 \times VT_{traf}^j$ | 21 | 40 |

Based on the thresholds noted in Table 2 and on a value defined as the idle link bandwidth, $ILBW_i$, in which;

$$ILBW_i = BW_t - \text{busy } DSOs \quad (6)$$

where $BW_t$ is the total direct link bandwidth and where DSO is a unit of bandwidth that is used to transport one call of a particular class of service. (For example, for voice service, a DSO is a 64 kbps channel. Thus, busy DSOs is the number of DSOs that are busy.) The VTG load states are then defined as shown in the following table.

TABLE 3

| Trunk Group Load State Definitions | |
|---|---|
| # Idle Trunks | State |
| $0 \leq ILBW^i < r_i$ | busy |
| $r_i \leq ILBW^i \leq R_T$ | R |
| $R_T < ILBW^i \leq TK1 \times r_i + R_T$ | HL |
| $TK1 \times r_i + R_T < ILBW^i \leq TK2 \times r_i + R_T$ | LL3 |
| $TK2 \times r_i + R_T < ILBW^i \leq TK3 \times r_i + R_T$ | LL2 |
| $TK3 \times r_i + R_T < ILBW^i$ | LL1 | where $R_T = \sum_{services_j} iR_{traf}^j \times r_j$.

It can be seen from Table 3 that the reservation level and state boundary thresholds are proportional to the estimated-traffic-load level, which means that the number of VTs reserved and the number of idle VTs required to constitute a "lightly loaded" $VTG^i$ increases and decreases with traffic load. In addition, $VTG^i$ reservation is only applied up to the $VT_{traf}^i$ level, which is approximately the capacity needed for the respective service to meet its blocking objective. That is, once the number of calls in progress for a particular service ($CIP^i$) reaches its estimated level of required VTs, then $VTG^i$ reservation is no longer needed to assist the respective $VTG^i$ in meeting its blocking objective. When $VTG^i$ reservation is no longer needed and is deactivated, the $VTG^i$ load state increases and the VTG's capacity becomes available for multiple link calls. Accordingly, $VTG^i$ reservation is activated and deactivated as the level of calls increase and decrease, respectively.

With the foregoing in mind, we now discuss the way in which the capacity of a direct link is selected. In particular, a minimum bandwidth $VT_{eng}^i$ for each direct link associated with a respective service i is guaranteed if there is blocking for the service and sufficient traffic to use the minimum guaranteed bandwidth. Thus, if a service i is meeting its blocking objective, then other services incorporated in the VHG are free to share the $VT_{eng}^i$ bandwidth allocated to the service i. Thus, in accordance with an aspect of the invention, the bandwidth making up a direct link (VHG) may be shared among the services using the link. This sharing process on the direct link is implemented to ensure that a VT on the direct link is available if the number of calls in progress for the service ($CIP^i$) is below the level of the minimum bandwidth $VT_{eng}^i$ engineered for that service. If $CIP^i$ is equal to or greater than $VT_{eng}^i$, then a call associated with a particular sevice i may be advanced to its destination by "seizing" an idle channel as long as the idle link bandwidth (ILBW) on the respective VHG is greater than the bandwidth reserved for other services that are not meeting their blocking objective. That is, if $$CIP^i \geq VT_{eng}^i \quad (7)$$

where $VT_{eng}^i$ is the minimum engineered bandwidth on the direct link for service i and $$ILBW^i \geq r_i + \sum_{j=i}^{N} \min[R^j, \max(0, VT_{eng}^j - CIP^j)] \times r_j \quad (8)$$

then a VT on the direct link may be selected for advancing the call to its destination.

In equation (8), the second expression beginning with the term "max" means that a call for a service that is engineered above its engineered call level can be routed on the direct link if there is capacity in excess of what is reserved for other services that are below their engineered call levels. Thus, the reserved bandwidth on a direct link for any service i is at most $VT_{eng}^i - CIP^i$, and the capacity of the direct link is reserved only if the reservation level of the associated service is triggered on the node pairs that are connected to one another by the respective direct link (i.e., $R^i$ is greater than 0). In addition, once the engineered level is reached, then calls may be routed over the direct link only when the bandwidth of the link is not reserved for other services which are below their $VT_{eng}^i$ values and not experiencing node-to-node blocking.

It is noted that a bandwidth allocation process contained in each node determines the value of $VT_{eng}^i$ for each service that the node handles. Moreover, the engineering process is designed to determine a $VT_{eng}^i$ value for each service making up a VHG such that the sum of those values is less than the total bandwidth ($BW_t$) allocated to the associated VHG. In this manner, the engineering process assures a minimum level of network performance for each service i.

As mentioned above, in the event that an originating node cannot use a direct link to advance an associated call to its destination, then the originating node may advance the call via an available two-link path. A two-link path comprises a direct link from the originating node to an intermediate node and a path, for example, a direct link, from the intermediate node to the terminating node. The originating node locates an available two-link path by obtaining from the terminating node a bit map indicative of load states (e.g., the LL1 load state) of respective VTGs extending to the terminating node from other nodes and then "anding" that bit map with a bit map indicative of allowed paths that the originating node may use, as discussed above. As also noted above, the allowed paths are those paths which meet the aforementioned quality assurance (TQA) parameters. The originating node then selects an LL1 path from the resulting bit map using a random selection process.

In an illustrative embodiment of the invention, the originating node selects the most desirable path in accordance with an illustrative path selection sequence defined in the following illustrative table:

TABLE 4

| Path Seq. # | Path Sequence Definition | |
|---|---|---|
| | A | B |
| Dir. | 1 | 1 |
| Via LL1 | 2 | 2 |
| Via LL2 | 3 | 3 |
| Via LL3 | 4 | 4 |
| Via HL | 5 ($CIP^i < D_1 \times VT_{traf}^i$) | 5 ($CIP^i < D_1 \times VT_{traf}^i$) |
| Via R | 6 ($CIP^i < D_2 \times VT_{traf}^i$) | 6 ($CIP^i < D_2 \times VT_{traf}^i$) |
| Via LL1 (G-2) | — | 7 |
| Via LL2 (G-2) | — | 8 |
| Via LL3 (G-2) | — | 9 |
| Via HL (G-2) | — | 10 ($CIP^i < D_2 \times VT_{traf}^i$) |
| Via R (G-2) | — | 11 ($CIP^i < D_2 \times VT_{traf}^i$) |

Specifically, Table 4 lists under columns A and B respective sequences that an originating node may use to advance a call to its destination. A discussion of the path choices listed under column A pertains equally well to the path choices listed under column B, except as noted below. For the choices listed under column A, the originating node selects a direct link as a first choice path, which should always be the case. If a direct link is not available, then the node selects as a second choice an intermediate path having an LL1 load state using the respective bit map received from the terminating node. If the originating node finds that an LL1 is not available, it then selects as a third choice an intermediate path having an LL2 state. If a path having an LL2 state is not available, then the originating node attempts to advance the call via a fourth choice intermediate path having an LL3 state. Thereafter, the originating node may attempt to route, or advance, the call via a fifth choice (heavily loaded state) and thence a sixth choice (reserved state). It is seen from Table 4, that the originating node may select the fifth choice following its failure to the advance the call via one of the preceding choices only if the condition associated with the fifth choice is found to be true. That is, the number of calls in progress for the respective service ($CIP^i$) is found to be less than a result obtained by multiplying the virtual trunk traffic demand ($VT_{traf}^i$) for that service by a respective "depth" parameter, D1. If that condition is found to to be false, then the originating node blocks the call from advancing and notifies the source of the call accordingly. If the fifth choice is not available, then the originating node may attempt to advance the call via the sixth choice (i.e., via an intermediate path having a reserved load state) only if the condition associated with that choice is found to be true. Hence, parameters D1 and D2 are factors which control the depth of the search for an intermediate path for a call of a particular class of service.

It is also seen from Table 4, that the sequence of choices listed under column B includes additional choices involving G-2 paths which do not meet the TQA requirements (mentioned above).

In general then, greater search depth is allowed if blocking is detected for a node pair, since the provision of multiple route choices serve to reduce that blocking. However, such depth is curtailed if the total blocking reaches a high level, indicating that a possible overload condition exists, in which case it is advantageous to reduce the number alternate route choices, as shown by the conditions imposed by Table 4. Also, if there are no direct VTs, or the node-to-node traffic demand $VT_{traf}^i$ is small, e.g., less than 15 VTs, then the search depth is increased, since trunk reservation becomes ineffective, in which case greater dependence is placed on routing via an intermediate path to meet network blocking objectives.

It can thus be appreciated that the path sequence selection as well as the depth parameters, D1 and D2, are controlled by (a) various blocking thresholds, (b) the existence or change in the number of direct VTs and (c) the level of direct traffic $VT_{traf}^i$, as shown by the illustrative values in the following Table 5. It is noted that a Table 5 is provided for each service i and is stored in the memory of each of the network nodes.

TABLE 5

| | Path Sequence Selection Thresholds | | | | | | |
|---|---|---|---|---|---|---|---|
| | Traffic Conditions | | | | Path Sequence Selection | | |
| Item | $VT_{traf}^i$ | $BW_T$ | Tot.Off.Blk. % | NN Blk. % | Path Seq. | $D_1$ | $D_2$ |
| A | all | >0 | [0,3] | [0,1] | 1 | 0 | 0 |
| | | | | (1,50] | 2 | 1.0 | 0 |
| | | | | (50,100] | 2 | 1.0 | .5 |
| B | all | >0 | (3,10] | [0,15] | 1 | 0 | 0 |
| | | | | (15,50] | 2 | .7 | 0 |
| | | | | (50,100] | 2 | .5 | .5 |
| C | all | >0 | (10,100] | [0,15] | 1 | 0 | 0 |
| | | | | (15,50] | 2 | .7 | 0 |

TABLE 5-continued

| | Path Sequence Selection Thresholds | | | | | | |
|---|---|---|---|---|---|---|---|
| | Traffic Conditions | | | | Path Sequence Selection | | |
| Item | $VT_{traf}^j$ | $BW_T$ | Tot.Off.Blk. % | NN Blk. % | Path Seq. | $D_1$ | $D_2$ |
| D | ≦15 | >0 | [0,3] | (50,100] | 2 | .5 | 0 |
| | | | | [0,1] | 2 | 1.0 | 0 |
| | | | | (1,100] | 2 | 1.0 | 1.0 |
| E | all | =0 | [0,3] | [0,1] | 2 | 1.0 | 0 |
| | | | | (1,100] | 2 | 1.0 | 1.0 |
| F | all | =0 | (3,100] | [0,100] | 2 | 1.0 | 0 |
| | | Failed | [0,100] | [0,15] | 1 | 0 | 0 |
| G | all | tks ≧ threshold | [0,10] (10,100] | (15,100] (15,100] | 2 2 | .5 .5 | .5 0 |

It is seen from Table 5, that the selection of a path sequence listed in Table 4 and values of the associated D1 and D2 parameters is governed by the traffic congestion occurring between the originating and terminating nodes as based on the (a) total-office (TO) blocking taken over a one-minute interval, (b) node-to-node (NN) blocking taken over a one-minute interval, and (c) existence of a direct link. Thus, for the condition shown for item B, if the node-to-node blocking is found to be between 0 and 15 percent, then the originating node uses the path sequences listed under column A of Table 4 with D1 and D2 parameter values of 0 and 0, respectively. If, on the other hand, the node-to-node blocking is found to be between 15 and 50 percent, then the originating node uses the path sequences listed under column B of Table 4 with D1 and D2 parameter values of 0.7 and 0, respectively, and so on. Accordingly, the blocking performance of a respective service may be controlled by controlling which Table 4 list, A or B, an originating node uses and how far down the list the node may access. In this way, the originating node may access intermediate nodes having heavily loaded or reserved states. However, such access is controlled by the use of Table 5.

(It is noted that the values of the parameters shown in Table 5 are empirical values obtained by simulating the conditions shown in Table 5 in a model of the invention.)

Figures 6, 7:
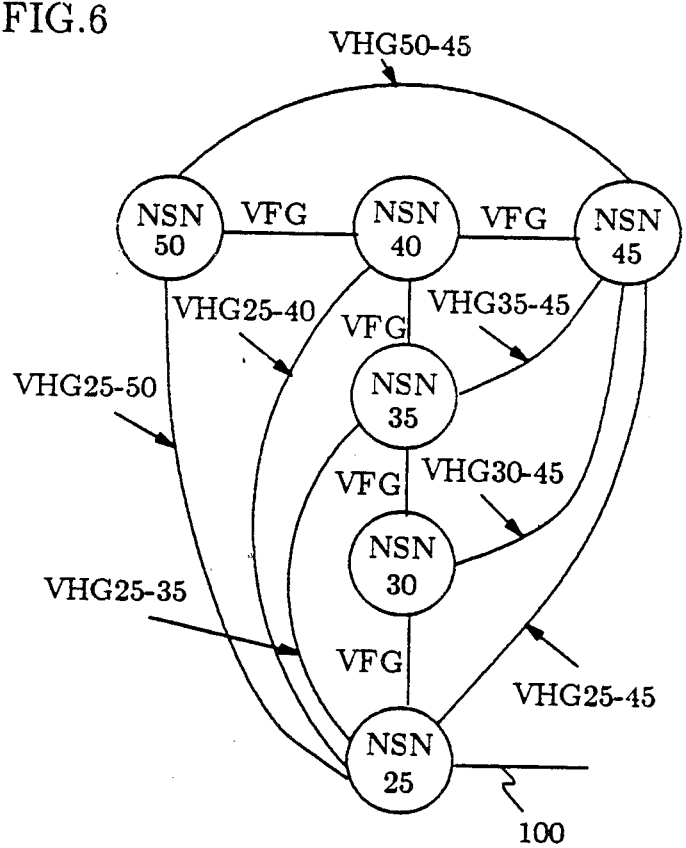

With the foregoing in mind, we now discuss a number of illustrative examples involving the use of bit maps in the routing of a call, as shown in FIGS. 6 and 7. For the sake of brevity, only the nodes shown in FIG. 4 including node 50 are depicted in FIG. 6. (In the FIG. 6, the nodes are identified by respective network switch numbers (NSN). Hereinafter, NSN will be taken to mean "node" and vice-versa.) In addition, for the sake of clarity, the VHGs (direct links) from node 25 to the other nodes, and the VHGs from nodes 30, 35, and 50 to node 45 are shown "detached" from network bandwidth 100.

In the following discussion it is assumed that node, or network switch number (NSN) 25 is the originating node and NSN 45 is the terminating node. Moreover, NSN 25 needs to advance a call to NSN 45, but NSN 25 does not have an available $VT^i$ in its direct link (VHG25-45) to NSN 45. Accordingly, NSN 25 will attempt to advance the call via a two-link path involving one of the backbone nodes 30, 35, 40 or 50.

Specifically, following the path sequence numbers provided by Table 4, NSN 25 obtains from NSN 45 a bit map of the LL1 $VTG^i$s which extend to NSN 45 from other nodes in the backbone path. The received bit map is shown at line "a" of FIG. 7 and indicates that the $VTG^i$s from NSNs 35 and 50 are the most lightly loaded (LL1), as identified by, for example, the binary value of one, shown below those NSNs. The bit map also indicates that the load state of VFG 100-4 from NSN 45 to NSN 40 is also most lightly loaded. NSN 25, in turn, "ands" the received bit map with its own bit map identifying the direct links which extend from NSN 25 to the other backbone nodes and which are listed in the bit map of line "a" which have an LL1 load state, as identified by, for example, the binary value of one as shown at line "b". NSN 25 then "ands" the result with a bit map (line "c") identifying the intermediate nodes which may be be used in advancing a call from NSN 25 to NSN 45. The resulting allowed-intermediate-switch (AISW) bit map is shown at line "d".

Accordingly, NSN 25 may select either NSN 35 or NSN 40 as the intermediate node in attempting to establish a two-link path between NSN 25 and NSN 45, the selection being done on a random basis. Armed with the ASIW, NSN 25 sends the call to, for example, NSN 35. If in the interim, NSN 35 finds that the load state of its VTG to NSN 45 has changed to, for example, LL3, then it may not accept the call and may notify NSN 25 of that fact by returning to the latter the well-known "CRANKBACK" signal via CCS 150 (not shown in the FIGS.). If, on the other hand, NSN 35 finds that not to be the case, then it may advance the call to NSN 45 via the respective $VTG^i$ of VHG 35-45 extending to NSN 45.

Figures 8, 10:
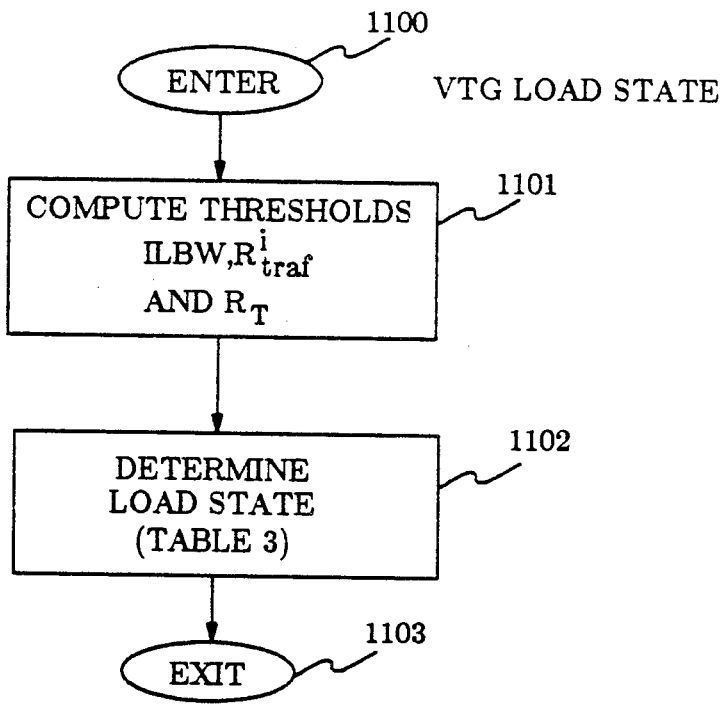

In the event that the bit map received from NSN 45 indicates that a $VTG^i$ having an LL1 load state is not available, i.e., the value on line "a" for each NSN is, for example, a binary zero, then NSN 25 may request from NSN 45 a bit map of the $VTG^i$s having a load state of LL2 and/or LL3, as shown in FIG. 8. Failing to advance the call using the resulting AISW line of FIG. 8, NSN 25 may continue the path sequence noted in Table 4. That is, NSN 25 may obtain from NSN 45 a bit map identifying the $VTG^i$s which extend to NSN 45 and which have a heavily loaded state (HL). As noted above, NSN 25 may obtain the latter bit map and then go on to obtain a bit map showing $VTG^i$s having a reserved state. As noted above, NSN 25 may use the HL state and then reserved state only if the associated conditions indicated in Table 4 are found to be true.

(It is noted that other examples of using bit maps which are applicable to the present invention are discussed in the aforementioned G. R. Ash et al. patent application.)

As mentioned above, the originating node may attempt to advance the call via a multilink path if a two-link path is not available. Advantageously, a multilink may employ bandwidth from the shared pool of bandwidth (VFG) to advance a call to its destination.

For example, and referring once again to FIG. 4, if a node, for example, node 25, fails to advance a call to another node, for example, node 45 via a two-link path, then node 25 may employ a multilink path to node 45 via a so-called backbone path. In the present illustrative example, such a backbone path includes intermediate nodes 30, 35 and 40. (It is understood of course that the backbone may include other nodes, such as, for example, nodes 50, 55 and 60 shown in FIG. 3). Specifically, node 25 may first attempt to route the call to node 40 via the direct link VHG25-40 between those nodes. If node 25 is successful in that attempt, then node 40 advances the call to node 45 via a direct link or via a channel obtained from VFG 100-4. If such a channel is not available, then the call is blocked, and the source of the call is notified accordingly.

If node 25 cannot route the call to node 40, then it may attempt to route the call to node 35 via VHG 25-35. Similarly, if node 25 is successful in that attempt, then node 35 will attempt to advance the call to node 45 via a channel obtained from VFG 100-3 extending to node 40. Node 35 does this by sending to node 40 a message containing a request that the VFG 100-3 channel be digitally extended to VFG 100-4 via the digital cross-connect arrangement contained in node 40. Accordingly, the call is advanced to node 45 if the foregoing turns out to be successful. However, as before, the call is blocked if a VFG 100-3 channel is not available. Similarly, if node 25 is not successful in routing the call to node 35, then it may attempt to route the call via node 30 using an available channel obtained from VFG 100-1. Like node 35, node 30 will then attempt to advance the call via a direct link or a channel obtained from VFG 100-2, if available. If the call is advanced via bandwidth obtained from VFG 100-2, then node 30 will send a message to nodes 35 and 40 requesting that they extend that channel to VFGs 100-3 and 100-4, respectively. Hence, the last choice path is a path consisting of all the backbone links.

We turn now to a discussion of the software which controls the operation of certain aspects of the invention, the software being stored in the memory of the No. 4ESS switch.

Figure 9:
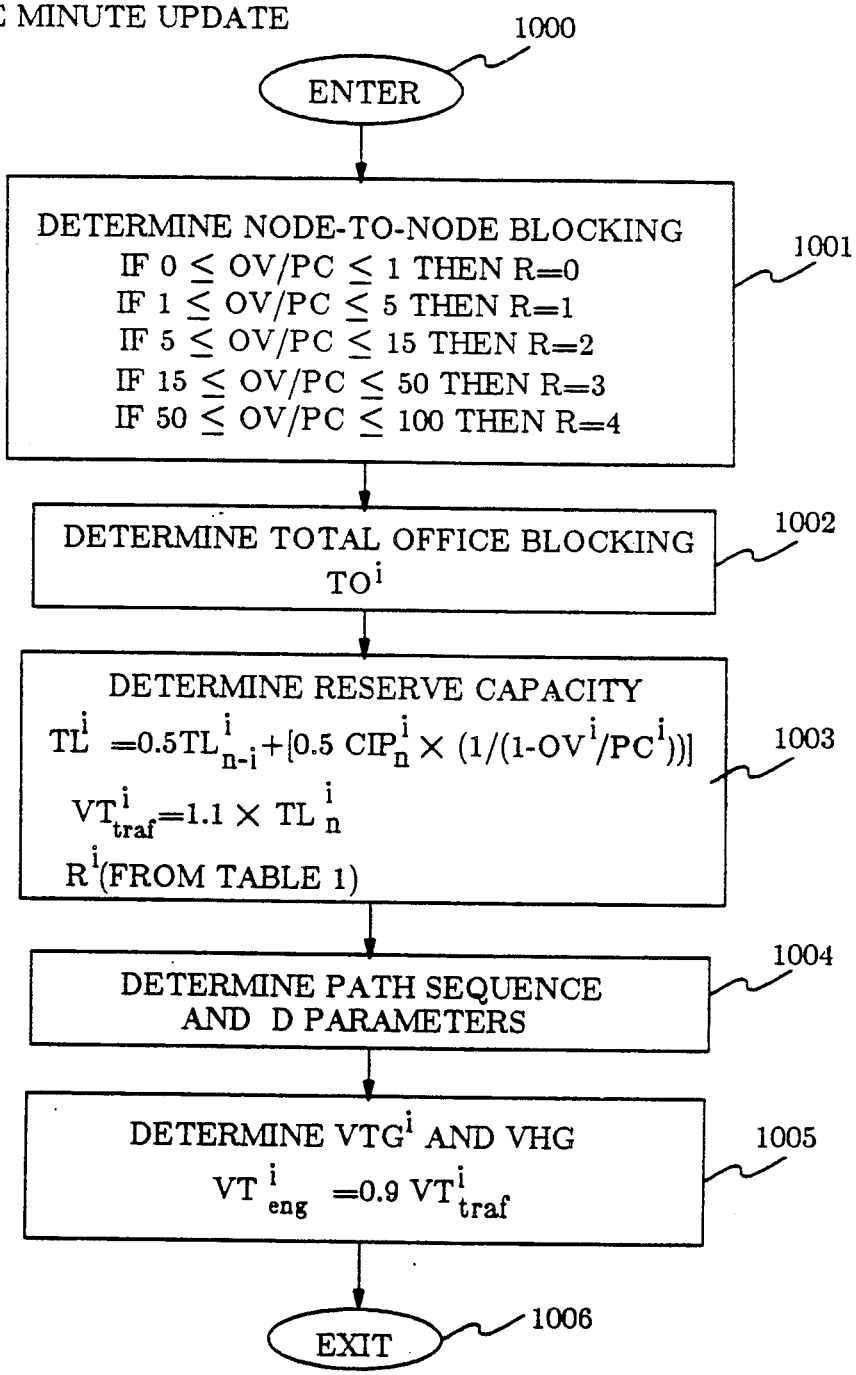
Figure 14:
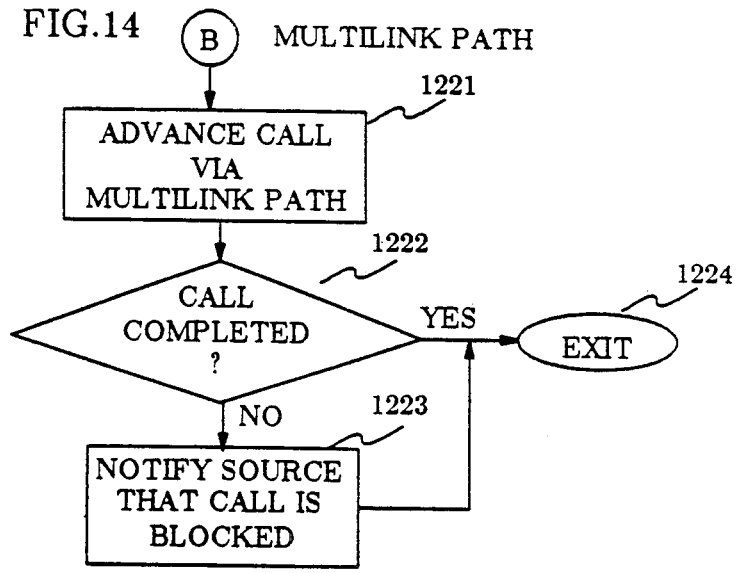

Turning then to FIG. 9, there is shown in flow chart form the program which is entered each minute to determine the parameters discussed above and size of each VHG that will be required during the ensuing one-minute interval.

In particular, when the program is entered at block 1000, it proceeds to block 1001 where it determines the values for Table 3 for each class of service that the switch expects to process during the ensuing one-minute intervals. The program then proceeds to block 1002 when it completes that task.

At block 1002, the program determines the total office-to-office blocking $TO^i$. The program does this by summing the total overflow counts (OV) to every other network node and dividing that result by the total peg counts (PC), or the number of attempted call set-ups, to every other node. That is:

$$TO^i = \frac{\sum_{\text{node } k} OV_k}{\sum_{\text{node } k} PC_k} \quad (9)$$

where k ranges over all distant node NSN values. The program then proceeds to block 1003 after determining the value for each $TO^i$. At block 1003, the program determines the reserved capacity for each $VTG^i$ in the manner discussed above, and then proceeds to block 1004. At block 1004, the program determines the path sequence and D1 and D2 depth parameters from Table 5 for each class of service. The program does this using the values obtained at the preceding blocks of the program. The program then proceeds to block 1005 where it determines the size of each $VTG^i$ that it believes it will need to process the expected level of traffic during the ensuing one minute interval. The program then determines the $VT_{eng}^i$ for each such VTG for each class of service and then exits via block 1006.

When the need arises, the program is entered at block 1100 of FIG. 10 to determine the load state for each $VTG^i$ of the associated node. When the program is entered at block 1100, it then proceeds to block 1101 where it determines the values of the thresholds noted therein for each $VTG^i$. The program does this in the manner described above. The program then proceeds to block 1102 where it uses load state Table 3 for each $VTG^i$ and stores the latter in the memory of the associated 4ESS switch. The program then exits via block 1103.

Turning now to FIG. 11, there is shown a flow chart of the program that is entered to advance a call to its destination. Specifically, when the program is entered at block 1200 it proceeds to block 1201 to determine if the number of calls in progress for the class of service ($CIP^i$) associated with the newly received call is less than the minimum bandwidth that was engineered for that class of service ($VT_{eng}^i$) for the current one minute interval. The program proceeds to block 1206 if it finds that to be the case. Otherwise, it proceeds to block 1202. At block 1202, the program checks to see if the idle link bandwidth (ILBW) on the respective VHG is greater than the bandwidth reserved for other services that are not meeting their blocking objective, as explained above in presenting equation (8). The program proceeds to block 1206 is it finds equation (8) to be true. Otherwise, the program proceeds to block 1203.

At block 1206, the program checks the VHG linking the associated node to the terminating node to determine if the VHG contains available bandwidth for advancing the call to the associated terminating node. The program proceeds to block 1207 if such bandwidth is available. Otherwise, the program proceeds to block 1203. At block 1207, the program sets up the call via the available bandwidth in the manner discussed above, and then exits via block 1205A.

At block 1203, the program proceeds to block 1204 if it determines that a new virtual high usage trunk (VHT) is required to advance the call to its destination. Otherwise, it proceeds to block 1208 of FIG. 12.

At block 1204, the program checks to see if there is available bandwidth on the VFG for establishing the new VHT to the terminating node, and proceeds to block 1205 if such bandwidth is available and called for by the VT estimation algorithm. Otherwise, the program proceeds to block 1208 of FIG. 12.

At block 1205, the program establishes the new VHT in the manner described above. That is, the program sends to each node in the path between its associated node and terminating node a message requesting that those nodes "cut through" the newly allocated bandwidth. As mentioned above, the program also sends the message to the terminating node, the messages being sent via CCS path 150. The program then exits via block 1205A.

Beginning at block 1208, the program attempts to advance the call via a two-link path. Thus, at block 1208, the program clears a register contained in memory and then consults Table 5 to determine which list in Table 4, A or B, will be used in that attempt. The program then proceeds to block 1209, where it proceeds to block 1210 if it finds that list "A" is to be used. Otherwise, it proceeds to block 1214. At blocks 1210 and 1214, the program stores in the aforementioned register, the Table 4 path (sequence) numbers it will use to advance the call. The program then proceeds to block 1211.

At block 1211, the program sends to the terminating node a request for bit maps associated with path number 2 (i.e., LL1 load state). It is to be understood of course that the program may include in that request bit maps associated with path numbers 3 and 4 (i.e., LL2 and LL3 load states). The program proceeds to block 1212 when it receives the requested bit map(s). At block 1212, the program performs the aforementioned "anding" functions to form a bit map of the allowed intermediate switches (AISW) and then proceeds to block 1213.

At block 1213, the program checks the AISW bit map to determine if an intermediate node to the terminating node is available. The program proceeds to block 1215 if it finds that to be the case. Otherwise, it proceeds to block 1221.

At block 1215, the program randomly selects an intermediate node from the AISW bit map, and sends the call to that node via a direct link (VHG) between the originating and intermediate nodes along with an appropriate message via CCS path 150. The program then waits for a predetermined period of time to see if the selected intermediate node accepted the call. The program proceeds to block 1216 following the end of the wait period. At block 1216, the program checks to see if it had received a so-called "crankback" signal from the intermediate node. As is well-known, if an intermediate node finds that it cannot advance a call to the terminating node, then it will return to the originating node via CCS path 150 a crankback signal. The program proceeds to block 1217 if it finds that it received a crankback signal. Otherwise, the program exits via block 1220.

At block 1217, the program checks the AISW bit map to see if the map identifies another intermediate node. The program returns to block 1215 if it finds that to be the case. If the current AISW bit map does not contain another allowed intermediate node, then the program proceeds to block 1218.

At block 1218, the program checks the contents of the aforementioned memory register to see if the register contains another allowed path number. (It is noted that the path numbers are erased from the register as they are used.) The program proceeds to block 1219 if a number is contained in the register. Otherwise, it proceeds to block 1221. At block 1219, the program, notes and then clears the next path number in the register. The program then returns to block 1211 to obtain the associated bit map(s) from the terminating node.

At block 1221, the program attempts to advance the call via a multilink path employing a backbone node, as discussed above. The program proceeds to block 1222 after it has sent the call to an intermediate node in the backbone path, in the manner described above. At block 1222, the program waits to see if it receives from the intermediate node a crankback message. If the message is not received within a predetermined period of time, e.g., one second, then the program exits via block 1224. Otherwise, the program proceeds to block 1223, where it notifies the source of the call that the call has been blocked.

Figure 15:
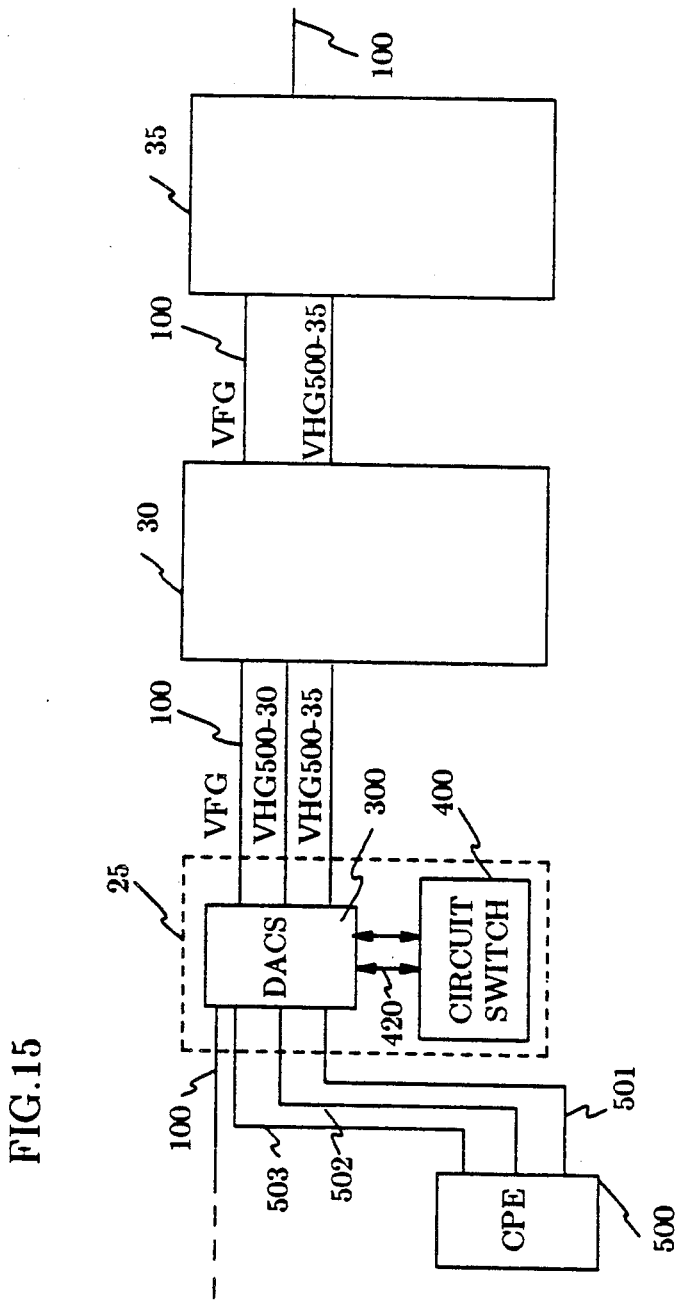
FIG. 15 is a broad block diagram illustrating the manner in which customer provided equipment may, in accordance with the principles of the invention, home in on more than one of the networks nodes of FIGS. 3 and 4.

As discussed above, each network node establishes VHU trunks to respective ones of the other network nodes. A network node may also establish, in accordance with an aspect of the invention, VHU trunks to so-called customer provided equipment (CPE), such as a private branch exchange. Thus, our fully shared network may be used in conjunction with a multiple homing capability to provide a variable level of connectivity to CPE, as shown in FIG. 15. In the arrangement, CPE 500, which may be, for example, a so-called business communication system (private branch exchange) is illustratively connected to the digital crossconnect and access arrangement (DACS) 300 contained in node 25 via communications paths 501-503. CPE 500 communicates with switch 400 via path 301, which is extended through DACS 300 to switch 400 via communication path 420.

Accordingly, CPE 500 may access network bandwidth 100 to establish direct links to respective network nodes, thereby allowing CPE 500 to "home in" on more than one node and distribute its telephone calls, both voice and data, between those nodes during periods of bursty traffic. For example, CPE 500 may direct switch 400 to establish a direct link (VHG) between node 30 and CPE 500 (shown as VHG 500-30) and a direct link between node 35 and CPE 500 (shown as VHG 500-35), thereby allowing CPE 500 to home in on nodes 30 and 35 via communication paths 502 and 503, respectively, and DACS 300.

Figure 16:
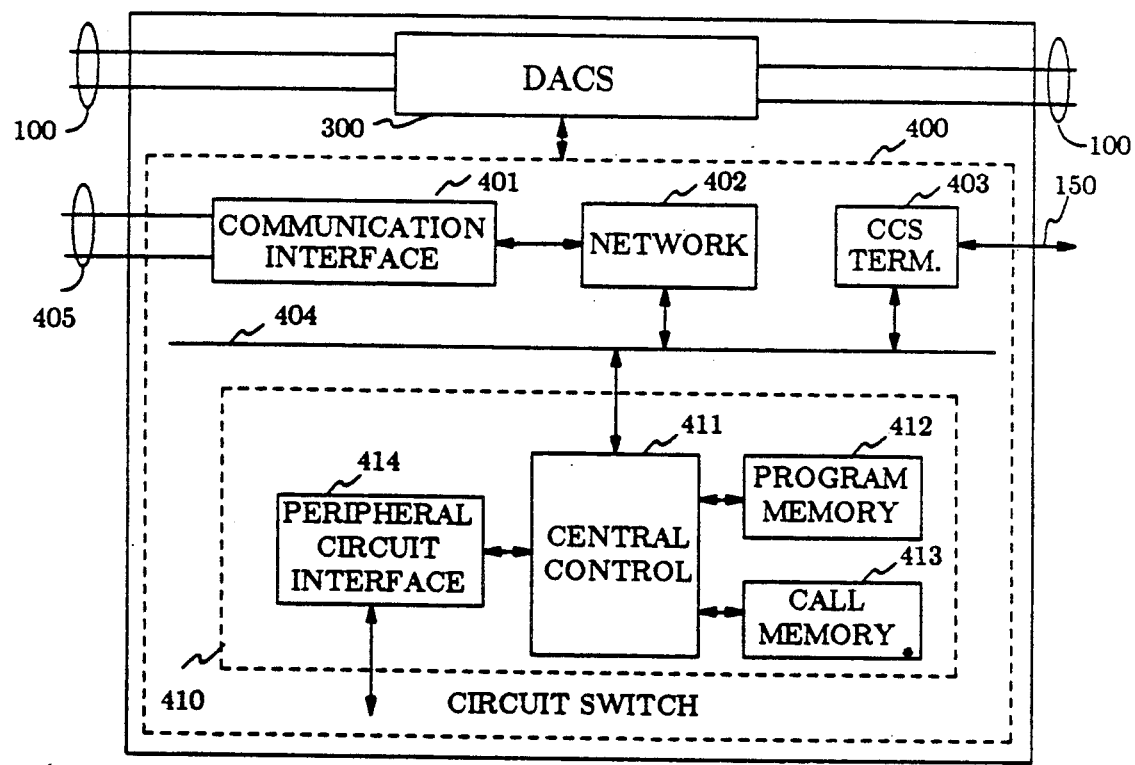
FIG. 16 is a broad block diagram of a network node in which the invention may be practiced.
Figure 17:
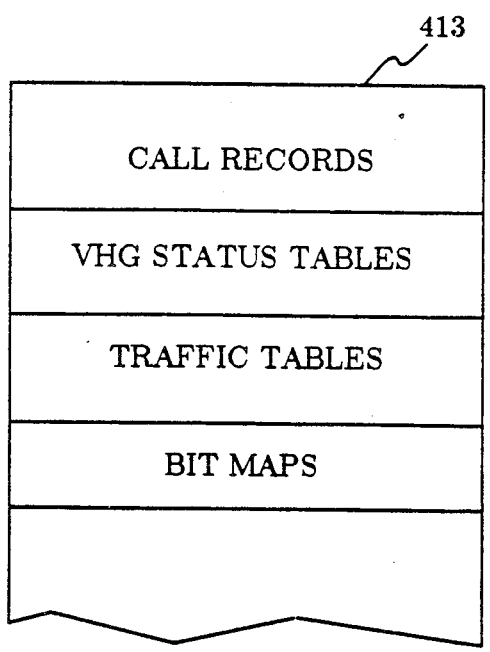
FIG. 17 illustrates the layout of call memory of the circuit switch of FIG. 15.

Turning now to FIG. 16, there is shown a broad block diagram of a system 200 node, for example, node 25, 30, 35, etc., in which the invention may be implemented. As mentioned above, a node includes, inter alia, a digital cross-connect arrangement 300 and a circuit switch 400. As also mentioned above, digital cross-connect arrangement 300 may be, for example, the Digital Access and Cross-Connect System IV (DACS IV) available from AT&T, and switch 400 may be, for example, the No. 4 ESS also available from AT&T. DACS IV is a modular high capacity electronic, digital cross-connect system, which is remotely controlled and which provides efficient cross-connections at the DS1 channel level and rearrangement of DS1 channels within DS3 channels. The heart of the DACS IV is a software based main controller, which features distributed processing. The main controller is supported by a hard disc and a tape cartridge for primary and secondary storage capacity, respectively. The No. 4 ESS includes, inter alia, (a) CPU 410, which controls the over all operation of the switch; (b) digital network 402, which extends telephone calls arriving via respective lines of cable 405 to DACS 300 and thence to another node of network 200 via network bandwidth 100; (c) communication interface 401, which interfaces the lines of cable 405, and hence, the telephone calls with circuit switch 400; and (d) CCS terminal 403, which interfaces CCS transmission facilities 150 with CPU 410 via common bus 404. CPU 410 includes, inter alia, (a) central control 411, (b) program and call memories 412 and 413, and (c) peripheral interface circuit 414 for interfacing a master control console (not shown) to central control 411. The program which implements the invention in the node is stored in memory 402, whereas, the one minute updates, foregoing Tables 1 through 5, records identifying respective VHGs, bits maps, etc., are stored in call memory 413, as shown in FIG. 17.

Although a specific embodiment of this invention has been shown and described, it will be understood that various modifications may be made without departing from the scope and spirit of the present invention. For example, our fully shared network may be employed in a packet switch network, in which each of the nodes shown in FIG. 4 is a packet switch, rather than a circuit switch, and in which network bandwidth 100 is used to interconnect the nodes, in the manner described above. Moreover, our fully shared network may be ideally employed in broadband packet switch services, such as, for example, a 150 Mbps Asynchronous Transfer Mode (ATM) packet network architecture that is currently being defined by the associated industry for broadband ISDN applications. It is to be understood of course that a packet switch embodying the principles of our invention may employ the concept of virtual high usage groups and virtual final group to segment the network bandwidth among the node pairs.

We claim:

1. A fully shared telecommunications network comprising
    a plurality of nodes interconnected via a network transmission facility, said network transmission facility having a predetermined network bandwidth that may be segmented into a plurality of channels of respective bandwidths, said predetermined network bandwidth forming a common pool of bandwidth that may be shared among said network nodes on a dynamic basis, and
    means, operative during a current interval of time and contained in each of said nodes, for dynamically establishing to other ones of said nodes respective direct links for routing calls of respective classes of services, each of said direct links being formed from a number of channels obtained from said common pool, and operative during a next succeeding interval of time for changing the number of channels forming ones of said direct links based on the number of said calls routed over said ones of said direct links during the prior interval of time.

2. The network set forth in claim 1 wherein said means for establishing includes means, contained in each of said nodes, for accumulating over each said interval of time traffic statistics associated with respective ones of said direct links, and
    means, operative during said current interval, for increasing the number of said channels forming a respective one of said direct links based on the associated traffic statistics accumulated over said prior interval, in which said number is increased by obtaining individual channels from said common pool as they are needed.

3. The network set forth in claim 1 wherein said means for establishing includes means, contained in each of said nodes, for accumulating over each said interval of time traffic statistics associated with respective ones of said direct links, and
    means, operative during said current interval, for decreasing the number of said channels forming respective ones of said direct links based on the associated traffic statistics accumulated over said prior interval, in which each said number is decreased by returning individual ones of said channels to said common pool when they are no longer needed.

4. A fully shared telecommunications network comprising
    a plurality of nodes interconnected via a network transmission facility, said network transmission facility having a predetermined bandwidth that may be segmented on a dynamic basis into a plurality of channels of respective bandwidths,
    means, contained in each of said nodes, for dynamically establishing to individual other ones of said nodes respective direct links for routing calls of respective classes of services, each of said direct links comprising groups of channels associated with respective ones of said classes of services, in which each of said channels is a respective segment of said predetermined network bandwidth, and in which the remaining bandwidth of said predetermined network bandwidth is reserved as a pool of bandwidth that may be shared among said network nodes on a dynamic basis, and
    means, responsive to receipt at an associated one of said nodes of a call associated with a particular class of service and responsive to the unavailability of an associated channel to a terminating node that is to receive said call, for routing said call to said terminating node via an available channel associated with a class of service different from the class of service associated with said call.

5. The network set forth in claim 4 wherein said means for routing includes means, operative when all of the channels of the direct link from said one node to said terminating node are busy, for then (a) obtaining from said terminating node data indicative of the availability of other direct links extending to said terminating node from individual ones of said other nodes, (b) selecting one of said other direct links based on said availability data, and (c) routing said call to said terminating node via a two-link path comprising a direct link from said one node to the node associated with said one of said other direct links and said one of said other direct links.

6. The network set forth in claim 5 wherein said means for obtaining said availability data includes means, operative when said availability data indicates that said other direct links are busy, for then routing said call via a multilink, backbone path including at least (a) the direct link from said one node to the node associated with said one of said other direct links and (b) a channel from said associated node to said terminating node, in which said channel is dynamically obtained from said shared pool.

7. The network set forth in claim 4 wherein said network is a packet switched network.

8. The network set forth in claim 4 wherein said transmission facilities includes optical fiber cable.

9. The network set forth in claim 4 wherein said nodes and said transmission facilities comprise a public switched network.

10. The network set forth in claim 9 wherein at least one of said nodes contains a circuit switch and a digital cross connect arrangement.

11. The network set forth in claim 4 wherein at least one of said nodes is customer provided equipment connected to at least one other one of said nodes.

12. A fully shared network comprising
    a first node and a plurality of second nodes,
    a transmission facility interconnecting each of said nodes, said transmission facility having a predetermined bandwidth divisible into a plurality of channels each having a respective bandwidth, means, contained in said first node and operative during a current predetermined interval of time, for dynamically establishing to individual ones of said second nodes respective direct links formed from a respective number of said channels, said channels being acquired as they are needed and said number being a function of traffic statistics accumulated by said first node during a preceding interval of time, and wherein the remaining channels of said transmission facility forming a pool of channels that may be shared among said nodes, and means, contained in said first node and thereafter operative responsive to receipt of a call identifying as a terminating node one of said individual ones of said second nodes, for advancing said call to said terminating node via a respective channel of the direct link to said terminating node.

13. The network set forth in claim 12 wherein the bandwidth of each of said channels is based on a respective class of service.

14. The network set forth in claim 12 wherein said means for advancing includes means operative when said call identifies as said terminating node a node adjacent to said first node for advancing said call to said adjacent node via a channel obtained in real time from said shared pool and for returning that channel to said shared pool when the call is terminated.

15. The network set forth in claim 12 wherein said means for advancing includes means operative when said direct link is not available for advancing said call to said terminating node for then obtaining from said terminating node data indicative of the availability of other direct links established by other ones of said second nodes to said terminating node and for advancing said call to said terminating node via a two-link path including a direct link to one of said other ones of said second nodes as identified by said availability data, and thence via a direct link established by said one of said other ones of said second nodes to said terminating node.

16. The network set forth in claim 15 wherein said means for obtaining includes means for storing in memory contained in said first node data indicative of the availability of each direct link established by said first node to said other ones of said second nodes, and wherein said two-link path is selected based on said stored availability data and said obtained availability data.

17. The network set forth in claim 16 wherein said availability data comprises data indicative of one of a plurality of grades of availability, including at least lightly loaded and heavily loaded grades of availability.

18. The network set forth in claim 12 wherein said network is a packet switched network.

19. The network set forth in claim 12 wherein said transmission facility includes optical fiber cables.

20. The network set forth in claim 12 wherein said nodes and said transmission facilities comprise a public switched network.

21. The network set forth in claim 12 wherein at least one of said nodes contains a circuit switch and a digital cross connect arrangement.

22. The network set forth in claim 21 wherein at least one of said nodes is customer provided equipment is connected to at least one other one of said nodes.

23. A telecommunications network having a plurality of switching nodes interconnected via network transmission facilities comprising means, contained in at least one of said nodes and operative during a predetermined interval of time, for accumulating traffic statistics characterizing traffic demand for calls sent to other ones of said nodes over respective priorly established direct links, said transmission facilities having a predetermined bandwidth divisible into a plurality of channels of respective bandwidths, said links being formed from groups of said channels, means, contained in said at least one of said nodes and operative during a succeeding interval of time, for determining the bandwidth of each of said direct links that will be required during said succeeding interval for the sending of calls to each of said other ones of said nodes, the bandwidth of each of said direct links being a function of said accumulated traffic statistics, and means for forming the remaining channels of said transmission facilities into a common pool of channels that may be fully shared among said network nodes, and wherein said means for determining the bandwidth of each of said links includes means operative when a call is to be sent to an adjacent one of said nodes for establishing a communication path between said at least one of said nodes and said adjacent node using a channel obtained from said common pool of channels and sending said call over that channel.

24. The network set forth in claim 23 wherein said network is a packet switched network.

25. The network set forth in claim 23 wherein said transmission facilities includes optical fiber cables.

26. The network set forth in claim 23 wherein said nodes and said transmission facilities comprise a public switched network.

27. The network set forth in claim 23 wherein at least one of said nodes contains a circuit switch and a digital cross connect arrangement.

28. The network set forth in claim 23 wherein at least another one of said nodes is customer provided equipment connected to more than one other one of said nodes.

29. In a telecommunications network comprising a plurality of switching nodes each connected to network transmission facilities, a method of establishing from at least one of said nodes to other ones of said nodes respective links for the transmission of telephone calls associated with respective classes of service, said method comprising the steps of accumulating during a preceding interval of time traffic statistics characterizing traffic demand and a grade of service constraint for calls of respective classes of services that said one node sends to said other nodes over respective ones of said links, and determining for a succeeding interval of time the bandwidth of each of said links that will be required during said succeeding interval for the sending of calls to said other nodes, in which the bandwidth of each of said links is determined as a function of said accumulated traffic statistics and the number of calls of the associated class of service that said at least one node expects to send over the respective one of said links during said succeeding interval of time.

* * * * *